United States Patent [19]
Sherwood, Jr.

[11] Patent Number: 5,968,348
[45] Date of Patent: *Oct. 19, 1999

[54] HYDROCONVERSION PROCESS EMPLOYING A PHOSPHORUS LOADED NIMO CATALYST WITH SPECIFIED PORE SIZE DISTRIBUTION

[75] Inventor: David Edward Sherwood, Jr., Beaumont, Tex.

[73] Assignee: Texaco Inc., Whtie Plains, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/518,773

[22] Filed: Aug. 24, 1995

Related U.S. Application Data

[60] Continuation-in-part of application No. 08/425,971, Apr. 20, 1995, Pat. No. 5,545,602, which is a division of application No. 08/242,995, May 16, 1994, Pat. No. 5,435,908.

[51] Int. Cl.$^6$ .............................. C10G 47/02; C10G 45/04
[52] U.S. Cl. ................................ 208/216 PP; 208/251 H; 208/254 H; 208/112
[58] Field of Search ........................ 208/216 PP, 251 H, 208/254 H, 112

[56] References Cited

U.S. PATENT DOCUMENTS

| | | | |
|---|---|---|---|
| 4,066,530 | 1/1978 | Aldridge et al. | 208/112 |
| 4,089,774 | 5/1978 | Oleck et al. | 208/89 |
| 4,225,421 | 9/1980 | Hensley, Jr. et al. | 208/216 PP |
| 4,357,263 | 11/1982 | Heck et al. | 208/216 PP |
| 4,395,328 | 7/1983 | Hensley, Jr. et al. | 208/251 |
| 4,395,329 | 7/1983 | Le Page et al. | 208/216 PP |
| 4,495,062 | 1/1985 | Hensley, Jr. et al. | 208/111 |
| 4,520,128 | 5/1985 | Morales et al. | 502/210 |
| 4,548,709 | 10/1985 | Bowes et al. | 208/216 PP |
| 4,549,957 | 10/1985 | Hensley, Jr. et al. | 208/216 PP |
| 4,572,778 | 2/1986 | Ward | 208/89 |
| 4,578,181 | 3/1986 | Derouane et al. | 208/110 |
| 4,652,545 | 3/1987 | Lindsley et al. | 502/255 |
| 4,746,419 | 5/1988 | Peck et al. | 208/213 |
| 4,778,588 | 10/1988 | Brandes et al. | 208/213 |
| 4,846,961 | 7/1989 | Robinson et al. | 208/216 PP |
| 4,886,594 | 12/1989 | Miller | 208/216 PP |
| 4,941,964 | 7/1990 | Dai et al. | 208/216 PP |
| 5,047,142 | 9/1991 | Sherwood, Jr. et al. | 208/216 PP |
| 5,108,581 | 4/1992 | Aldridge et al. | 208/108 |
| 5,221,656 | 6/1993 | Clark et al. | 502/315 |
| 5,320,743 | 6/1994 | Dai et al. | 208/216 PP |
| 5,397,456 | 3/1995 | Dai et al. | 208/108 |
| 5,399,259 | 3/1995 | Dai et al. | 208/216 PP |
| 5,416,054 | 5/1995 | Dai et al. | 502/211 |
| 5,435,908 | 7/1995 | Nelson et al. | 208/216 PP |
| 5,514,273 | 5/1996 | Sherwood, Jr. et al. | 208/216 |
| 5,545,602 | 8/1996 | Nelson et al. | 502/314 |

FOREIGN PATENT DOCUMENTS 567 272 A1  10/1993  European Pat. Off. .
590 894 A1  4/1994   European Pat. Off. .

*Primary Examiner*—Walter D. Griffin
*Attorney, Agent, or Firm*—Henry H. Gibson; Arnold, White & Durkee

[57] ABSTRACT

A process for converting a charge of heavy hydrocarbons containing components boiling above 1000° F. to a product containing a decreased content of components boiling above 1000° F. and decreased sediment content employing a NiMo catalyst having a specified pore distribution under hydroconversion conditions is disclosed. The process includes contacting the charge of heavy hydrocarbon with hydrogen in the presence of a heterogeneous catalyst supported on alumina and containing $\leq 2.5$ wt % of silica and bearing 2.2 to 6 wt % of a Group VIII metal oxide, 7 to 24 wt % of a Group VIB metal oxide and 0.3 to 2 wt % of a loaded phosphorus oxide, the phosphorous being loaded onto the catalyst as aqueous phosphoric acid. The catalyst also may be characterized by having a Total Surface Area of 175 to 205 m$^2$/g, a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, $\geq 65\%$ of the micropore volume is present as micropores of diameter $\pm 25$ Å about a pore mode by volume of 110 to 130 Å, less than 0.05 cc/g of micropore volume is present in micropores with diameters less than 80 Å.

22 Claims, No Drawings

HYDROCONVERSION PROCESS EMPLOYING A PHOSPHORUS LOADED NIMO CATALYST WITH SPECIFIED PORE SIZE DISTRIBUTION

CROSS-REFERENCE

This application is a Continuation-in-Part of U.S. application Ser. No. 08/425,971 filed Apr. 20, 1995 now U.S. Pat. No. 5,545,602 which is a divisional of application Ser. No. 08/242,995, filed May 16, 1994 now U.S. Pat. No. 5,435,908.

FIELD OF THE INVENTION

This invention relates to a process for hydrotreating a hydrocarbon feed. More particularly it relates to a hydroconversion process employing a catalyst with a specified pore size distribution which achieves improved levels of hydroconversion of feedstock components having a boiling point greater than 1000° F. to products having a boiling point less than 1000° F., improved hydrodesulfurization, particularly improved sulfur removal from the unconverted 1000° F. products, and reduced sediment make and which allows operations at higher temperatures.

BACKGROUND OF THE INVENTION

As is well known to those skilled in the art, it is desirable to convert heavy hydrocarbons, such as those having a boiling point above about 1000° F., into lighter hydrocarbons which are characterized by higher economic value. It is desirable to treat hydrocarbon feedstocks, particularly petroleum residue, to achieve other goals including hydrodesulfurization (HDS), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e. micropores, herein defined as pores having diameters less than 250 Å) and pores having relatively large diameters (i.e. macropores, herein defined as pores having diameters greater than 250 Å).

One approach to developing improved catalysts for petroleum resid processing has involved enlarging the micropore diameters of essentially monomodal catalysts (having no significant macroporosities) to overcome diffusion limitations. Catalysts which are essentially monomodal with small micropore diameters and low macroporosities designed for improved petroleum resid HDS include for example, those disclosed in U.S. Pat. Nos. 4,738,944; 4,652,545; 4,341,625; 4,309,278; 4,306,965; 4,297,242; 4,066,574; 4,051,021; 4,048,060 (first-stage catalyst); U.S. Pat. Nos. 3,770,617; and 3,692,698, discussed herein. Essentially monomodal catalysts with larger micropore diameters and low macroporosities designed for improved petroleum resid HDM are typified by those disclosed in U.S. Pat. Nos. 4,328,127; 4,082,695; 4,048,060 (second-stage catalyst); and U.S. Pat. No. 3,876,523, discussed herein.

U.S. Pat. No. 4,738,944 (Robinson et al.) discloses a catalyst composition useful in the hydrotreatment of hydrocarbon oils, the catalyst containing nickel and phosphorus and about 19–21.5% Mo (calculated as the oxide) on a porous refractory oxide, having a narrow pore size distribution wherein at least 10% of the Total Pore Volume is in pores having diameters less than 70 Å, at least 75% of the Total Pore Volume is in pores having diameters between 50–110 Å, at least 60% of the Total Pore Volume is in pores having diameters within about 20 Å above and below the average pore diameter, and at most 25% of the Total Pore Volume, most preferably less than 10% of the Total Pore Volume is in pores having diameters greater than 110 Å.

U.S. Pat. No. 4,652,545 (Lindsley et al.) discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a Total Pore Volume (TPV) of 0.5–1.5 cc/g with a pore diameter distribution such that (i) at least 70% TPV is in pores having 80–120 Å diameters, (ii) less than 0.03 cc/g of TPV is in pores having diameters of less than 80 Å, and (iii) 0.05–0.1 cc/g of TPV is in pores having diameters of greater than 120 Å.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VIB or Group VIII metal, or combinations thereof) on a porous support, the catalyst being further characterized by having a TPV of 0.5–1.1 cc/g with at least 70% TPV in pores having diameters of 80–150 Å and less than 3% TPV in pores having diameters greater than 1000 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullated bed, slurry, disperse phase, or fluidized bed reactor, where the catalyst comprises a hydrogenation component (i.e. Group VIB or Group VIII metal) on a porous support, and is further characterized by having a BET Surface Area of 250–450 m$^2$/g, a BET Pore Volume of 0.9–2.0 cc/g with no more than 0.05–0.20 cc/g of TPV in pores having diameters of greater than 400 Å.

U.S. Pat. No. 4,306,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150 Å, and 0–20% TPV in pores having diameters greater than 150 Å.

U.S. Pat. No. 4,297,242 (Hensley, Jr. et al.) discloses a two-stage process for the catalytic hydrotreatment of hydrocarbon streams containing metal and sulfur compounds, the process comprises: (i) first contacting the feedstock with hydrogen and a demetallation catalyst comprising a Group VIB and/or Group VIII metal; and (ii) thereafter reacting the effluent with a catalyst consisting essentially of at least one Group VIB metal on a porous support, and having a TPV of 0.4–0.9 cc/g and a pore size distribution such that pores having diameters of 50–80 Å constitute less than 40% TPV, pores having diameters of 80–100 Å constitute 15–65% TPV, pores having diameters of 100–130 Å constitute 10–50% TPV, and pores having diameters of greater than 130 Å less than 15% TPV.

U.S. Pat. No. 4,066,574 (Tamm) discloses a catalyst composition useful in the hydrodesulfurization of a hydrocarbon feedstock containing organometallic compounds, the catalyst comprising Group VIB and Group VIII metal components on a porous support, and having a TPV of 0.5–1.1 cc/g with a pore diameter distribution such that at least 70% TPV is in pores of diameters of 80–150 Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VIB and Group VIII metal on a porous support, having a TPV of 0.3–1.0 cc/g with a pore diameter distribution such that greater than 50% TPV is in pores of diameters of 70–160 Å, and pores having diameters below 70 Å and above 160 Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VIB and Group VIII metal on a porous support and having a mean pore diameter of 30–60 Å; and (ii) contacting the first hydrodesulfurized hydrocarbon product with hydrogen and a second catalyst under hydrodesulfurization conditions, the second catalyst comprising a Group VIB and Group VIII metal on a porous support, further characterized by having a TPV of 0.45–1.50 cc/g with 0–0.5 cc/g of TPV in pores having diameters greater than 200 Å, 0–0.05 cc/g of TPV in pores having diameters below 120 Å, and at least 75% TPV in pores having diameters ±10 Å of a mean pore diameter of 140–190 Å.

U.S. Pat. No. 3,770,617 (Riley et al.) discloses a process for the desulfurization of a petroleum hydrocarbon feed comprising contacting the feed with hydrogen and a catalyst, the catalyst comprising a Group VIB or Group VIII metal on a porous support having greater than 50% TPV in pores of 30–80 Å, less than 4% TPV in pores having diameters 200–2000 Å, and at least 3% TPV in pores having diameters greater than 2000 Å.

U.S. Pat. No. 3,692,698 (Riley et al.) discloses a catalyst useful in hydroprocessing of heavy feed stocks, the catalyst comprising a mixture of Group VIB and Group VIII metals on a porous support having a pore size distribution such that a major portion of its TPV is in pores of diameters ranging from 30–80 Å, less than 4% TPV is in pores of diameters of 200–2000 Å, and at least 3% TPV is in pores of diameters greater than 2000 Å.

U.S. Pat. No. 4,328,127 (Angevine et al.) discloses a catalyst composition for use in the hydrodemetallation-desulfurization of residual petroleum oils, the catalyst comprising a hydrogenating component (i.e. Group VIB or Group VIII metal, or combinations thereof) on a porous support, further characterized by having a is TPV of 0.45–1.5 cc/g with 40–75% TPV in pores having diameters of 150–200 Å, and up to 5% TPV in pores having diameters of greater than 500 Å.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, and having a surface area of 110–150 m$^2$/g and a pore size distribution such that at least 60% of TPV is in pores having diameters of 100–200 Å and not less than 5% TPV is in pores having diameters greater than 500 Å.

U.S. Pat. No. 3,876,523 (Rosinski et al.) discloses a process for the demetallizing and desulfurizing of residual petroleum oil comprising contacting the oil with hydrogen and a catalyst, the catalyst comprising a Group VIB and Group VIII metal on a porous support having a pore size distribution such that greater than 60% TPV is in pores having diameters of 100–200 Å, at least 5% TPV is in pores having diameters greater than 500 Å, 10% TPV or less is in pores having diameters less than 40 Å, and the surface area of the catalyst is 40–150 m$^2$/g.

Early petroleum distillate hydrotreating catalysts generally were monomodal catalysts with very small micropore diameters (less than say 100 Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,746,419, 4,395,328, 4,395,329, and 4,089,774, discussed herein.

U.S. Pat. No. 4,746,419 (Peck et al.) discloses an improved hydroconversion process for the hydroconversion of heavy hydrocarbon feedstocks containing asphaltenes, metals, and sulfur compounds, which process minimizes the production of carbonaceous insoluble solids and catalyst attrition rates. Peck et al. employs a catalyst which has 0.1 to 0.3 cc/g of its pore volume in pores with diameters greater than 1,200 Å and no more than 0.1 cc/g of its pore volume in pores having diameters greater than 4,000 Å. The instant invention will be distinguished from Peck, et al. (U.S. Pat. No. 4,746,419) in that Peck discloses only features of macropore size distribution useful for minimizing the production of carbonaceous insoluble solids and does not disclose a pore size distribution which would provide additional hydroconversion and hydrodesulfurization activities, whereas, the catalysts of the instant invention require a unique pore size distribution in order to provide additional hydroconversion of feedstock components having a boiling point greater than 1000° F. to products having a boiling point less than 1000° F. and additional hydrodesulfurization. The instant invention gives improved levels of hydroconversion of feedstock components having a boiling point greater than 1000° F. to products having a boiling point less than 1000° F., improved hydrodesulfurization, particularly improved sulfur removal from the unconverted 1000° F.+ boiling point products, and reduced sediment make at the same operating conditions and allows operations at higher temperatures compared to operations with a commercial vacuum resid hydroconversion catalyst having a macropore size distribution which satisfies the requirements of Peck, et al. (U.S. Pat. No. 4,746,419).

U.S. Pat. No. 4,395,328 (Hensley, Jr. et al.) discloses process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VIB or Group VIII metal, an oxide of phosphorus, and an alumina support, where the alumina support material initially had at least 0.8 cc/g of TPV in pores having diameters of 0–1200 Å, at least 0.1 cc/g of TPV is in pores having diameters of 1200–50,000 Å, a surface area in the range of 140–190 m$^2$/g, and the support material was formed as a composite comprising alumina and one or more oxides of phosphorus into a shaped material and was thence heated with steam to increase the average pore diameter of the catalyst support material prior to impregnation with active metals. The instant invention is distinguished from Hensley, Jr., et al. in that the support of the instant invention does not contain one or more oxides of phosphorus, is not heated with steam to increase the average pore diameter, and requires a higher surface area of about 205–275 m$^2$/g and there is a much more precise definition of pore volume distribution.

U.S. Pat. No. 4,395,329 (Le Page et al.) discloses a hydrorefining process of a high metal-containing feedstock employing a catalyst containing alumina, a metal from group VI and a metal from the iron group, the catalyst having a Total Surface Area of 120–200 m$^2$/g, a Total Pore Volume of 0.8–1.2 cc/g, and a Pore Diameter Distribution whereby 0–10% of the Total Pore Volume is present as micropores with diameters less than 100 Å, 35–60% of the Total Pore Volume is in pores with diameters of 100–600 Å, and 35–55% of the Total Pore Volume is present as macropores of diameter greater than 600 Å. The instant invention is distinguished from Le Page et al. (U.S. Pat. No. 4,395,329) in that Le Page et al. requires 35–55% of the TPV in pores with a diameter >600 Å and the catalysts of the instant invention have only about 21–27% of the PV in pores greater than 600 Å.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VIB metal and an iron group metal (i.e. iron, cobalt, or nickel) on a porous support, and having a surface area of 125–210 m$^2$/g and TPV of 0.4–0.65 cc/g with at least 10% TPV in pores having diameters less than 30 Å, at least 50% of pore volume accessible to mercury being in pores having diameters of 30–150 Å, and at least 16.6% of pores accessible to mercury being in pores having diameters greater than 300 Å. The instant invention is distinguished from Oleck et al. (U.S. Pat. No. 4,089,774) in that Oleck et al. requires a relatively low Total Pore Volume of only 0.4–0.65 cc/g, whereas, the catalysts of the instant invention require much higher Total Pore Volumes of 0.82–0.98 cc/g.

U.S. Pat. No. 5,221,656, to Clark et al. discloses a hydroprocessing catalyst comprising at least one hydrogenation metal selected from the group consisting of the Group VIB metals and Group VIII metals deposited on an inorganic oxide support, said catalyst characterized by a surface area of greater than about 220 m$^2$/g, a pore volume of 0.23–0.31 cc/g in pores with radii greater than about 600 Å (i.e., in pores with diameters greater than 1200 Å), an average pore radius of about 30–70 Å in pores with radii less than about 600 Å (i.e., an average pore diameter of about 60–140 Å in pores with diameters less than about 1200 Å), and an incremental pore volume curve with a maximum at about 20–50 Å radius (i.e., at about 40–100 Å diameter). In the instant invention, pores having a diameter greater than 1200 Å are only about 0.15–0.20 cc/g and the incremental pore volume curve has a maximum (i.e., Pore Mode) at 110–130 Å. Also, reflective of the larger range of sizes of Pore Modes, the instant catalysts have much lower surface areas of 175–205 m$^2$/g.

A recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i. e., sulfur removal from hydrocarbon product of a hydrotreated petroleum resid having a boiling point greater than 1000° F.) but limited macroporosities to limit poisoning of the interiors of the catalyst particles. Catalysts with micropore diameters intermediate between the above described monomodal HDS and HDM catalysts with limited macroporosities include those of U.S. Pat. Nos. 4,941,964, 5,047,142 and 5,399,259 and copending U.S. application Ser. No. 08/425,971 (D# 92,030-C1-D1), now U.S. Pat. No 5,545,602, which is a divisional of U.S. Pat. No. 5,435,908, discussed herein.

U.S. Pat. No. 4,941,964 (to Texaco as assignee of Dai, et al.) discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VIB metal and 0–2.0 weight % of an oxide of phosphorus on a porous alumina support, having a surface area of 150–210 m$^2$/g and a Total Pore Volume (TPV) of 0.50–0.75 cc/g such that 70–85% TPV is in pores having diameters of 100–160 Å and 5.5–22.0% TPV is in pores having diameters of greater than 250 Å.

U.S. Pat. No. 5,047,142 (to Texaco as assignee of Sherwood, Jr., et al.), discloses a catalyst composition useful in the hydroprocessing of a sulfur and metal-containing feedstock comprising an oxide of nickel or cobalt and an oxide of molybdenum on a porous alumina support in such a manner that the molybdenum gradient of the catalyst has a value of less than 6.0 and 15–30% of the nickel or cobalt is in an acid extractable form, having a surface area of 150–210 m$^2$/g, a Total Pore Volume (TPV) of 0.50–0.75 cc/g, and a pore size distribution such that less than 25% TPV is in pores having diameters less than 100 Å, 70.0–85.0% TPV is in pores having diameters of 100–160 Å and 1.0–15.0% TPV is in pores having diameters greater than 250 Å.

U.S. Pat. No. 5,399,259 (to Texaco as assignee of Dai, et al.) discloses a process for the hydrotreatment of a sulfur-, metals- and asphaltenes-containing feed which comprises contacting said feed with hydrogen and a catalyst in a manner such that the catalyst is maintained at isothermal conditions and is exposed to a uniform quality of feed, the catalyst comprising 3–6 wt % of an oxide of a Group VIII metal, 14.5–24 wt % of an oxide of a Group VIB metal and 0–6 wt % of an oxide of phosphorus on a porous alumina support, having a surface area of 165–230 m$^2$/g and a Total Pore Volume (TPV) of 0.5–0.8 cc/g such that less than 5% of TPV is in pores with diameters less than about 80 Å, at least 65% of the pore volume in pores with diameters less than 250 Å is in pores with diameters ±20 Å of a Pore Mode of about 100–135 Å and 22–29% TPV is in pores having diameters of greater than 250 Å. The instant invention is distinguished from Dai et al. (U.S. Pat. No. 5,399,259) in that Dai et al. requires a relatively low Total Pore Volume of only 0.5–0.8 cc/g and a relatively low macroporosity of 22–29% TPV in pores having diameters of greater than 250 Å, whereas, the catalysts of the instant invention require much higher Total Pore Volumes of 0.82–0.98 cc/g and a much higher level of macroporosity of 29.6–33.0% TPV in pores having diameters of greater than 250 Å.

In related copending U.S. application Ser. No. 08/425,971 (D# 92,030-C1-D1), now U.S. Pat. No. 5,545,602, which is a divisional of U.S. Pat. No. 5,435,908 (to Texaco as assignee of Nelson et al.) there is disclosed a hydrotreating process employing, as catalyst, a porous alumina support with pellet diameters of 0.032–0.038 inches bearing 2.5–6 w % of a Group VIII non-noble metal oxide, 13–24 w % of a Group VIB metal oxide, less than or equal to 2.5 w % of silicon oxide, typically about 1.9–2 w % of intentionally added silica oxide, and 0–2 w % of a phosphorus oxide, preferably less than about 0.2 w % of a phosphorus oxide, with no phosphorus-containing components intentionally added during the catalyst preparation, said catalyst having a Total Surface Area of 165–210 m$^2$/g, a Total Pore Volume of 0.75–0.95 cc/g, and a Pore Diameter Distribution whereby 14–22% of the Total Pore Volume is present as macropores of diameter ≧1000 Å, 22–32% of the Total Pore Volume is present as pores of diameter ≧250 Å, 68–78% of the Total Pore Volume is present as pores of diameter ≤250 Å, 26–35% of the Total Pore Volume is present as mesopores of diameters ≧200 Å, 34–69% of the Total Pore Volume is present as secondary micropores of diameters 100–200 Å, 5–18% of the Total Pore Volume is present as primary micropores of diameter ≤100 Å, and ≧57% of the micropore volume is present as micropores of diameter ±20 Å about a pore mode by volume of 100–145 Å. The instant case employs as catalyst, a porous alumina support with pellet diameters of 0.032–0.044 inches, preferably 0.039–0.044 inches, bearing 2.2–6 w % of a Group VIII non-noble metal oxide, 7–24 w % of a Group VIB metal oxide, less than or equal to 2.5 w % of silicon oxide, preferably 1.3–2.5 w % of intentionally added silica oxide, and 0.3–2 w % of a phosphorus oxide, preferably 0.5–1.5 w % of a phosphorus oxide, with phosphorus-containing components intentionally added during the catalyst preparation, said catalyst having a Total Surface Area of 175–205 $m^2/g$, a Total Pore Volume of 0.82–0.98 cc/g, and a Pore Diameter Distribution whereby 29.6–33.0% of the Total Pore Volume is present as macropores of diameter greater than 250 Å, 67.0–70.4% of the Total Pore Volume is present as micropores of diameter less than 250 Å, ≧65% of the micropore volume is present as micropores of diameter ±25 Å about a pore mode by volume of 110–130 Å, and less than or equal to 0.05 cc/g of micropore volume is present in micropores with diameters less than 80 Å.

A recent approach to developing improved catalysts for the hydroconversion of feedstock components having a boiling point greater than 1000° F. to products having a boiling point less than 1000° F. has involved the use of catalysts having micropores intermediate between the above described monomodal HDS and HDM catalysts with pore volumes in the HDS type of range and with macroporosities sufficient to overcome the diffusion limitations for conversion of feedstock components having boiling points greater than 1000° F. into products having boiling points less than 1000° F. but limited macroporosities so as to limit poisoning of the interiors of the catalyst particles. Such catalysts are described in U.S. Pat. No. 5,397,456 (To Texaco as assignee of Dai et al.) and copending U.S. application Ser. No. 08/130,472 (D# 92,067), now U.S. Pat. No. 5,514,273, discussed herein.

U.S. Pat. No. 5,397,456 (to Texaco as assignee of Dai et al.) discloses a catalyst composition useful in the hydroconversion of a sulfur- and metal-containing feedstock comprising an oxide of a Group VIII metal and an oxide of a Group V-IB metal and optionally phosphorus on a porous alumina support, the catalyst having a Total Surface Area of 240–310 $m^2/g$, a Total Pore Volume of 0.5–0.75 cc/g, and a Pore Diameter Distribution whereby 63–78% of the Total Pore Volume is present as micropores of diameter 55–115 Å and 11–18% of the Total Pore Volume is present as macropores of diameter greater than 250 Å. The heavy feedstocks are contacted with hydrogen and with the catalyst. The catalyst is maintained at isothermal conditions and is exposed to a uniform quality of feed. The process of Dai et al. is particularly effective in achieving desired levels of hydroconversion of feedstock components having a boiling point greater than 1000° F. to products having a boiling point less than 1000° F. The instant invention is distinguished from U.S. Pat. No. 5,397,456 in that Dai et al. requires a catalyst with a Pore Diameter Distribution wherein 63–78% of the Total Pore Volume is present as micropores of diameter 55–115 Å and 11–18% of the Total Pore Volume is present as macropores of diameter greater than 250 Å, whereas, the catalysts employed in the instant invention have only about 20–25% of the Total Pore Volume present as micropores of diameter 55–115 Å and 29.6–33.0% of the Total Pore Volume is present as macropores of diameter greater than 250 Å.

In related copending U.S. application Ser. No. 08/130,472 (D# 92,067), now U.S. Pat. No. 5,514,273, there is disclosed a hydrotreating process and catalyst wherein 50–62.8% of the TPV is present in micropores of diameter 55–115 Å and 20–30.5% of the TPV is present as macropores of diameter greater than 250 Å. In the instant case, the catalyst preferably has only about 20–25% of the TPV present in pores having diameter of 55–115 Å.

None of the above-identified catalyst types in the art have been found to be effective for achieving all of the desired improved process needs. Early catalysts in the art addressed the need for improved hydrodesulfurization and/or hydrodemetallation as measured in the total liquid product. One recent line of catalyst development, as typified by U.S. Pat. Nos. 4,941,964 and 5,047,142, has been to develop improved catalysts for petroleum bottoms HDS (i.e., selective sulfur removal from the unconverted hydrocarbon product having a boiling point greater than 1000° F. from a hydroprocess operating with significant hydroconversion of feedstocks components [e.g., petroleum resids] having a boiling point greater than 1000° F. to products having a boiling point less than 1000° F.). More recent developments of petroleum bottoms HDS catalysts, as typified by U.S. Pat. No. 5,399,259 and copending U.S. application Ser. No. 08/425,971 (D# 92,030-C1-D1), now U.S. Pat. No. 5,545,602, which is a divisional of U.S. Pat. No. 5,435,908, have been to develop petroleum bottoms HDS catalysts with a degree of sediment control allowing the use of higher temperatures and reducing sediment make. However, none of the above-described petroleum bottoms HDS catalysts give improved levels of hydroconversion of feedstocks components having a boiling point greater than 1000° F. to products having a boiling point less than 1000° F. while, at the same time, reducing sediment make.

A second line of catalyst development, as typified by U.S. Pat. No. 5,397,456 and copending U.S. application Ser. No. 08/130,472 (D# 92,067), now U.S. Pat. No. 5,514,273 has been to develop hydroconversion catalysts for the improved hydroconversion of feedstocks components having a boiling point greater than 1000° F. to products having a boiling point less than 1000° F. The most recent developments of hydroconversion catalysts, as typified by U.S. application Ser. No. 08/130,472 (D# 92,067), now U.S. Pat. No. 5,514,273 have been to develop hydroconversion catalysts with slightly improved bottoms HDS activities and some slight degree of sediment control allowing the use of some higher temperatures and reducing sediment make. Although the above-described hydroconversion catalysts give improved levels of hydroconversion of feedstocks components having a boiling point greater than 1000° F. to products having a boiling point less than 1000° F., they do not give the desired levels of sulfur removal obtained from the above-described petroleum bottoms HDS catalysts and these hydroconversion catalysts still make some amount of sediment.

It would be desirable if a catalyst were available which provided improved hydroconversion, improved bottoms HDS, and no sediment make and which could also withstand operation at higher temperatures, so that it would be possible to attain an even higher level of hydroconversion without the undesirable formation of sediment. Undesirable low levels of hydroconversion represent a problem which is particularly acute for those refiners who operate vacuum resid hydroprocessing units at their maximum heat and/or temperature limits. Such limits often exist when refiners are operating at maximum charge rates.

It is an object of this invention to provide a process for hydroconverting a charge hydrocarbon feed, particularly, to hydroconvert feedstock components having boiling points greater than 1000° F. into products having boiling points less than 1000° F. while simultaneously removing high amounts of sulfur from the unconverted 1000° F.+ product stream. It is also an object of this invention to provide improved conversion at low Existent IP Sediment values in the 650° F.+ boiling point product (Discussed below under "Sediment Measurement"). It is also an object of this invention to allow the use of higher operating temperatures with reduced sediment make. Other objects will be apparent to those skilled in the art.

STATEMENT OF THE INVENTION

In accordance with certain of its aspects, this invention is directed to a process for hydroprocessing a charge hydrocarbon feed containing components boiling above 1000° F., and sulfur, metals, and carbon residue which comprises contacting said charge hydrocarbon feed with hydrogen at isothermal hydroprocessing conditions in the presence of, as catalyst, a porous alumina support containing ≦2.5 wt % of silica and bearing 2.2–6 wt % of a Group VIII metal oxide, 7–24 wt % of a Group VIB metal oxide, and 0.3–2 wt % of a phosphorus oxide, said catalyst having a Total Surface Area of 175–205 m$^2$/g, a Total Pore Volume of 0.82–0.98 cc/g, and a Pore Diameter Distribution whereby 29.6–33.0% of the Total Pore Volume is present as macropores of diameter greater than 250 Å, 67.0–70.4% of the Total Pore Volume is present as micropores of diameter less than 250 Å, ≧65% of the micropore volume is present as micropores of diameter ±25 Å about a pore mode by volume of 110–130 Å, less than 0.05 cc/g of micropore volume is present in micropores with diameters less than 80 Å, thereby forming hydroprocessed product containing decreased content of components boiling above 1000° F. and sulfur, metals, and carbon residue; and recovering said hydroprocessed product containing decreased content of components boiling above 1000° F., and of sulfur, metals, and carbon residue, recovering said hydroprocessed product containing decreased content of sulfur in the portion of the hydroprocessed product boiling above 1000° F., and recovering said hydroprocessed product containing decreased content of sediment in the portion of the hydroprocessed product boiling above 650° F.

The catalyst of the instant invention allows operation at about +10° F. and about +8 wt % 1000° F. conversion compared to operations with a first generation H-OIL catalyst. This constitutes a substantial economic advantage.

DESCRIPTION OF THE INVENTION

Feedstock

The hydrocarbon feed which may be charged to the process of this invention may include heavy, high boiling petroleum cuts typified by gas oils, vacuum gas oils, petroleum cokes, residual oils, vacuum resids, etc. The process of this invention is particularly useful to treat high boiling oils which contain components boiling above 1000° F. to convert them to products boiling below 1000° F. The charge may be a petroleum fraction having an initial boiling point of above 650° F. characterized by presence of an undesirable high content of components boiling above 1000° F., and sulfur, carbon residue and metals; and such charge may be subjected to hydrodesulfurization (HDS). In particular, the charge may be undiluted vacuum resid.

A typical charge which may be utilized is an Arabian Medium/Heavy Vacuum Resid having the following properties:

TABLE I

| Property | Value |
|---|---|
| API Gravity | 4.8 |
| 1000° F.+, vol % | 87.5 |
| 1000° F.+, wt % | 88.5 |
| 1000° F.– wt % | 11.5 |
| Sulfur, wt % | 5.1 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212° F. | 2430 |
| @ 250° F. | 410 |
| @ 300° F. | 117 |
| Pour Point, ° F. | 110 |
| n-C$_5$ Insolubles, wt % | 28.4 |
| n-C$_7$ Insolubles, wt % | 9.96 |
| Toluene Insolubles, wt % | 0.02 |
| Asphaltenes, wt % | 9.94 |
| Metals, wppm | |
| Ni | 49 |
| V | 134 |
| Fe | 10 |
| Cu | 3 |
| Na | 49 |
| Total Metals wppm | 245 |
| Chloride, wppm | 28 |

It is a particular feature of the process of this invention that it may permit treating of hydrocarbon charge, particularly those containing components boiling above about 1000° F., to form product which is characterized by an increased content of components boiling below 1000° F. and by decreased content of undesirable components typified by sulfur, metals, and carbon residue. It is another feature of the process of the instant invention that it provides improved sulfur removal from the unconverted 1000° F. products. It is another feature of the process of the instant invention that it provides the above mentioned improvements with little or no sediment formation as measured by the Existent IP Sediment values of the 650° F.+ boiling point product. It is another feature of the process of the instant invention that it allows operations at higher temperatures with consequent higher levels of 1000° F.+ to 1000° F.– than may be achieved with the use of first generation catalysts.

Sediment Measurement

It is a particular feature of the catalyst of this invention that it permits operation to be carried out under conditions which yield a substantially decreased content of sediment in the product stream leaving hydrotreating.

The charge to a hydroconversion process is typically characterized by a very low sediment content of 0.01 weight percent (wt %) maximum. Sediment is typically measured by testing a sample by the Shell Hot Filtration Solids Test (SHFST). See Jour. Inst. Pet. (1951) 37 pages 596–604 Van Kerknoort et al.—incorporated herein by reference. Typical hydroprocessing processes in the art commonly yield Shell Hot Filtration Solids of above about 0.17 wt % and as high as about 1 wt % in the 650° F.+ product recovered from the bottoms flash drum (BFD). Production of large amounts of sediment is undesirable in that it results in deposition in downstream units which in due course must be removed. This of course requires that the unit be shut down for an undesirable long period of time. Sediment is also undesirable in the products because it deposits on and inside various pieces of equipment downstream of the hydroprocessing unit and interferes with proper functioning of e.g. pumps, heat exchangers, fractionating towers, etc.

Very high levels of sediment formation (e.g., 1 wt %), however, are not usually experienced by those refiners who operate vacuum resid hydroprocessing units at or near their maximum heat and feedstock charge rates. Such units are generally operating at moderate conversion levels of feedstock components having boiling points greater than 1000° F. into products having boiling points less than 1000° F. (say, 40–65 volume percent—vol %—conversion) and at relatively low but still undesirable values of sediment (e.g., 0.17 wt %).

In the instant invention the IP 375/86 test method for the determination of total sediment has been very useful. The test method is described in ASTM Designation D 4870-92— incorporated herein by reference. The IP 375/86 method was designed for the determination of total sediment in residual fuels and is very suitable for the determination of total sediment in our 650° F.+ boiling point product. The 650° F.+ boiling point product can be directly tested for total sediment which is designated as the "Existent IP Sediment value." We have found that the Existent IP Sediment Test gives essentially equivalent test results as the Shell Hot Filtration Solids Test described above.

We have noted, however, that even 650° F.+ boiling point products which give low Existent IP Sediment values, may produce additional sediment upon storage. Thus, we have developed a more severe test for sediment. In this modified test, 50 grams of 650° F.+ boiling point product are heated to about 90° C. and mixed with about 5 milliliters of reagent grade hexadecane. The mixture is aged for about one hour at about 100° C. The resultant sediment is then measured by the IP 375/86 test method. The values obtained from this modified test are designated the "Accelerated IP Sediment values."

As it is recommended that the IP 375/86 test method be restricted to samples containing less than or equal to about 0.4 to 0.5 wt % sediment, we reduce sample size when high sediment values are observed. This leads to fairly reproducible values for even those samples with very large sediment contents.

It will be noted that catalysts of this invention, characterized by (i) about 0.15–0.20 cc/g of pores in the $\geq$1200 Å range, (ii) about 21–27% of TPV in pores in the $\geq$600 Å range, (iii) 29.6–33.0% of the TPV in pores having a diameter of $\geq$250 Å, (iv) 67.0–70.4% of the TPV in micropores of diameter less than 250 Å, (v) $\geq$65% of the micropore volume in micropores of diameter ±25 Å about a pore mode by volume of 110–130 Å, (vi) about 20–25% of the TPV in pores having a diameter of 55–115 Å, and (vii) less than 0.05 cc/g micropore volume in micropores with diameters less than 80 Å.—are particularly advantageous in that they permit attainment of product hydrocarbon streams containing the lowest content of sediment at highest conversion, while producing product characterized by low sulfur, carbon residue and metals contents. It is a feature of the catalyst of this invention that it permits attainment of hydrotreated product with <0.15 wt % sediment, as measured by the Existent IP Sediment test in the portion of the hydroprocessed product boiling above 650° F., typically as low as 0.0–0.1 wt %, preferably 0.0–0.05 wt %, say 0.05 wt %.

Reaction Conditions

In the practice of the process of this invention (as typically conducted in a single-stage Robinson reactor in pilot plant operations), the charge hydrocarbon feed is contacted with hydrogen at isothermal hydrotreating conditions in the presence of catalyst. Pressure of operation may be 1500–10,000 psig, preferably 1800–2500 psig, say 2250 psig. Hydrogen is charged to the Robinson Reactor at a rate of 2000–10,000 SCFB, preferably 3000–8000, say 7000 SCFB. Liquid Hourly Space Velocity (LHSV) is typically 0.1–1.5, say 0.56 volumes of oil per hour per volume of liquid hold-up in the reactor. Temperature of operation is typically 700–900° F., preferably 750–875° F., say 760° F. Operation is essentially isothermal. The temperature may typically vary throughout the bed by less than about 20° F.

In another more preferred embodiment of the process of the instant invention, the liquid and gaseous effluent from the previously described first-stage Robinson reactor is routed to a second-stage Robinson reactor containing the same weight of catalyst as had been loaded to the first-stage Robinson reactor and which is operated at essentially the same temperature and pressure as the first-stage Robinson reactor. The difference in average temperature between the first- and second-stage reactors is 0° F.–30° F., preferably 0° F.–15° F., say 0° F. No additional hydrogen is normally injected to the second-stage Robinson reactor. The liquid effluent passes through the second-stage Robinson reactor at a similar LHSV to that of the first-stage Robinson reactor. The liquid effluent from the first-stage Robinson reactor is uniformly contacted with the hydrogen-containing gaseous effluent and the second loading of catalyst at isothermal conditions in the second-stage Robinson reactor. No attempt is made to maintain constant catalytic activity by periodic or continuous withdrawal of portions of used catalyst and replacement of the withdrawn material with fresh catalyst in the two-stage Robinson reactor system. The catalyst begins as fresh catalyst and accumulates catalyst age generally expressed in barrels per pound. The average temperature is defined as the average of the temperatures of the first- and second-stage reactors. Average temperature of operation is typically 700–900° F., preferably 750–875° F., say 760° F. Overall, the hydrocarbon charge passes through the entire process system (i.e., the first- and second-stage Robinson reactors) at an overall LHSV of 0.05–0.75, say 0.28 volumes of oil per hour per volume of liquid hold-up in the reactor.

In general, reaction may be carried out in one or more continuously stirred tank reactors (CSTR's), such as Robinson reactors, in which the catalyst is exposed to a uniform quality of feed.

In one particularly preferred embodiment of the process of the instant invention, a sulfur-and metal-containing hydrocarbon feedstock is catalytically hydroprocessed using the H-OIL (TM) Process configuration. H-OIL is a proprietary ebullated bed process (co-owned by Hydrocarbon Research, Inc. and Texaco Development Corporation) for the catalytic hydrogenation of residua and heavy oils to produce upgraded distillate petroleum products and an unconverted bottoms product particularly suited for blending to a low sulfur fuel oil. The ebullated bed system operates under essentially isothermal conditions and allows for exposure of catalyst particles to a uniform quality of feed.

In the H-OIL Process, a catalyst is contacted with hydrogen and a sulfur- and metal-containing hydrocarbon feedstock by means which insures that the catalyst is maintained at essentially isothermal conditions and exposed to a uniform quality of feed. Preferred means for achieving such contact include contacting the feed with hydrogen and the catalyst in a single ebullated bed reactor, or in a series of 2–5 ebullated bed reactors, with a series of two ebullated bed reactors being particularly preferred. This hydroprocessing process is particularly effective in achieving high levels of hydrodesulfurization with vacuum residua feedstocks.

In the H-OIL Process, the hydrocarbon charge is admitted to the first-stage reactor of a two-stage ebullated bed H-OIL unit in the liquid phase at 650° F.–850° F., preferably 700° F.–825° F. and 1000–3500 psia, preferably 1500–3000 psia. Hydrogen gas is admitted to the first-stage reactor of a two-stage ebullated bed H-OIL unit in amount of 2000–10,000 SCFB, preferably 3000–8000 SCFB. The hydrocarbon charge passes through the first-stage ebullated bed reactor at a LHSV of 0.16–3.0 $hr^{-1}$, preferably 0.2–2 $hr^{-1}$. During operation, the catalyst bed is expanded to form an ebullated bed with a defined upper level. Operation is essentially isothermal with a typical maximum temperature difference between the inlet and outlet of 0° F.–50° F., preferably 0° F.–30° F. The liquid and gaseous effluent from the first-stage reactor is then routed to the second-stage reactor of the two-stage H-OIL unit which is operated at essentially the same temperature and pressure as the first-stage reactor. The difference in average temperature between the first- and second-stage reactors is 0° F.–30° F., preferably 0° F.–15° F. Some additional hydrogen may optionally be injected to the second-stage reactor to make up for the hydrogen consumed by reactions in the first-stage reactor.

In the H-OIL process, constant catalytic activity is maintained by periodic or continuous withdrawal of portions of used catalyst and replacement of the withdrawn material with fresh catalyst. Fresh catalyst is typically added at the rate of 0.05–1.0 pounds per barrel of fresh feed, preferably 0.20–0.40 pounds per barrel of fresh feed. An equal volume of used catalyst is withdrawn and discarded to maintain a constant inventory of catalyst on the volume basis. The catalyst replacement is performed such that equal amounts of fresh catalyst are added to the first-stage reactor and the second-stage reactor of a two-stage H-OIL unit.

Catalyst Support

The catalyst support may be alumina. Although the alumina may be alpha, beta, theta, or gamma alumina, gamma alumina is preferred.

The charge alumina which may be employed in practice of this invention may be available commercially from catalyst suppliers or it may be prepared by variety of processes typified by that wherein 85–90 parts of pseudoboehmite alumina is mixed with 10–15 parts of recycled fines. Silica ($SiO_2$) may be incorporated in small amounts typically up to about 2.5 wt % on the finished catalyst basis, and preferably 1.3–2.5 wt % on the finished catalyst basis. Acid is added and the mixture is mulled and then extruded in an Auger type extruder through a die having cylindrical holes sized to yield a calcined substrate having a diameter of 0.032–0.044 inches, preferably 0.039–0.044 inches. Extrudate is air-dried to a final temperature of typically 250–275° F. yielding extrudates with 20–25% of ignited solids. The air-dried extrudate is then calcined in an indirect fired kiln for 0.5–4 hours in an atmosphere of air and steam at typically about 1000° F.–1150° F.

Catalysts of the Instant Invention—Pore Size Distribution

The catalyst which may be employed is characterized by Total Surface Area (TSA), Total Pore Volume (TPV), and (Pore Diameter Distribution (Pore Size Distribution PSD). The Total Surface Area is 175–205 $m^2/g$, preferably 175–195 $m^2/g$, say 178 $m^2/g$. The total Pore Volume (TPV) may be 0.82–0.98, preferably 0.82–0.90, say 0.83 cc/g.

Less than 0.05 cc/g of micropore volume is present in micropores with diameters less than 80 Å.

Micropores of diameter in the range of less than 250 Å are present in an amount of about 67.0–70.4% of the Total Pore Volume, preferably 67.0–69.1% TPV, say 67.0% TPV. Preferably greater than or equal to 65% of the micropore volume is present as micropores of diameter ±25 Å about a pore mode by volume of 110–130 Å.

The amount of Total Pore Volume in the range of 55–115 Å is only about 20–25% and preferably 20.8%.

The Pore Size Distribution is such that 29.6–33% of the Total Pore Volume, and preferably about 33.0% is present as macropores of diameter greater than 250 Å.

The amount of Total Pore Volume in pores with a diameter greater than 600 Å is only about 21–27% and preferably 26.6% TPV.

The amount of Total pore Volume in pores having a diameter greater than 1200 Å is only about 0.15–0.20 cc/g and preferably 0.20 cc/g.

It should be noted that the percentages of the pores in the finished catalyst are essentially the same as in the charge gamma alumina substrate from which it is prepared—although the Total Surface Area of the finished catalyst may be 75–85%, say 80% of the charge gamma alumina substrate from which it is prepared (i.e., 75–85% of a support surface area of 205–275 $m^2/g$, say 221 $m^2/g$). It should also be noted that the Median Pore Diameter by Surface Area from mercury porosimetry of the finished catalyst is essentially the same as that of the charge gamma alumina substrate from which it is prepared.

It is also noted that the Pore Size Distribution (percent of total) in the finished catalyst may be essentially the same as in the charge alumina from which it is prepared (unless the majority of the pore volume distribution in a given range is near a "break-point"—e.g. 80 Å or 250 Å, in which case a small change in the amount of pores of a stated size could modify the reported value of the pore volume falling in a reported range). The Total Pore Volume, of the finished catalyst may be 75%–98%, say 80% of the charge alumina from which it is prepared.

Catalysts of the Instant Invention—Metals Loadings

The alumina charge extrudates may be loaded with metals to yield a product catalyst containing a Group VIII non-noble oxide in amount of 2.2–6 wt %, preferably 3.0–3.5 wt %, say 3.3 wt % and a Group VIB metal oxide in amount of 7–24 wt %, preferably 12.5–15.5 wt %, say 14.4 wt %.

The Group VIII metal may be a non-noble metal such as iron, cobalt, or nickel. This metal may be loaded onto the alumina typically from a 10%–30%, say 15% aqueous solution of a water-soluble salt (e.g. a nitrate, acetate, oxalate etc.). The preferred metal is nickel, employed as about a 11.3 wt % aqueous solution of nickel nitrate hexahydrate $Ni(NO_3)_2.6H_2O$.

The Group VIB metal can be chromium, molybdenum, or tungsten. This metal may be loaded onto the alumina typically from a 10%–40%, say 20% aqueous solution of a water-soluble salt. The preferred metal is molybdenum, employed as about a 15.5 wt % aqueous solution of ammonium molybdate tetrahydrate $(NH_4)_6Mo_7O_{24}.4H_2O$.

It is a feature of the catalyst of the invention that it contains about 0.3–2 wt % of $P_2O_5$ and preferably about 0.5–1.5 wt %. This level of phosphorus oxide loading is very small representing only 0.13–0.87 wt % of elemental phosphorus and preferably 0.22–0.87 wt % of elemental phosphorus. The phosphorus component may be loaded onto the alumina as a 0–4 wt %, say 1.1 wt % aqueous solution of 85 wt % phosphoric acid $H_3PO_4$ in water.

As described above, silica $SiO_2$ may be incorporated into the catalyst supports prior to impregnation and may therefore be present in small amounts typically up to about 2.5 wt %, and preferably 1.3–2.5 wt %, although the benefits of the invention may be attained without addition of silica.

These catalyst metals and phosphorus may be loaded onto the alumina support by impregnating the latter with a solution of the former. Although it is preferred to load the metals simultaneously, it is possible to load each separately. Small amounts of $H_2O_2$ may be added to stabilize the impregnating solution. It is preferred that the catalyst be impregnated by filling 90–105%, preferably 97–98%, say 97% of the substrate pore volume with the solution containing the requisite amounts of metals and phosphorus. Loading is followed by drying and calcining at 900° F.–1250° F., preferably 1150° F.–1210° F., say 1180° F. for 0.5–5 hours, say 1.0 hour.

Another feature of the catalyst composition of the instant invention is that the ratio of the measured hydrodesulfurization (HDS) microactivity rate constant k of the catalyst of the instant invention to the measured HDS microactivity rate constant k of a standard hydroprocessing catalyst (namely, Criterion HDS-1443B, a commercially available, state-of-the-art catalyst for use in hydroprocessing resid oils), has a value of 0.5–1.0, preferably 0.6–0.85. As used in this description, the phrase "HDS microactivity" means the intrinsic hydrodesulfurization activity of a catalyst in the absence of diffusion, as measured according to the HDS Microactivity (HDS-MAT) Test, described as follows. In the HDS-MAT Test, a given catalyst is ground to a 30–60 mesh fraction and presulfided at 750° F. with a gas stream containing 10% $H_2S$/90% $H_2$. The catalyst is then exposed to a sulfur-containing feed, namely benzothiophene, which acts as a model sulfur compound probe, at reaction temperature and with flowing hydrogen for approximately 4 hours. Samples are taken periodically and analyzed by gas chromatography for the conversion of benzothiophene to ethylbenzene, thereby indicating the hydrodesulfurization properties of the catalyst being tested. The activity is calculated on both a catalyst weight and catalyst volume basis to account for any density differences between catalysts. The conditions for a typical HDS-MAT Test are as follows:

Temperature: about 550° F.

Pressure: about atmospheric

Feedstock: about 0.857 molar Benzothiophene in reagent grade normal heptane

Space Velocity: 4 $hr^{-1}$

Catalyst Charge: 0.5 gram

The kinetics of the reactor used in the HDS-MAT Test are first order, plug flow. At the above stated temperature and space velocity, the rate constant, k, may be expressed as $$k=\ln(1/1-HDS)$$

where HDS is the fractional hydrodesulfurization value obtained for a given catalyst at the above-stated conditions. A commercially available, state-of-the-art catalyst sold for use in hydroprocessing resid oils (Criterion HDS-1443B catalyst) was evaluated with the HDS-MAT Test under the above stated conditions and was found to have a % HDS value of 73% on a weight basis and a corresponding rate constant k value of 1.3093. Additional details of the HDS-MAT Test can be found in U.S. Pat. No. 5,047,142 to Texaco as assignee of Dai et al., supra, incorporated herein by reference. The catalysts of the instant invention require that the ratio of the measured HDS-MAT rate constant k, relative to that obtained with Criterion HDS-1443B, have values of 0.5–1.0, preferably 0.6–0.85, whereas the catalysts of U.S. Pat. No. 5,047,142 are required to have values >1.0, preferably >1.5.

It is another feature of the catalyst composition of the instant invention that the oxide of molybdenum, preferably $MoO_3$, is distributed on the above described porous alumina support in such a manner that the molybdenum gradient is about 1.0. As used in this description, the phrase "molybdenum gradient" means the ratio of molybdenum/aluminum atomic ratio observed on the exterior surfaces of catalyst pellets relative to the molybdenum/aluminum atomic ratio observed on surfaces of a sample of the same catalyst which has been ground to a fine powder, the atomic ratios being measured by X-Ray photoelectron spectroscopy (XPS), sometimes referred to as Electron Spectroscopy for Chemical Analysis (ESCA). It is theorized that the molybdenum gradient is strongly affected by the impregnation of molybdenum on the catalyst support and the subsequent drying of the catalyst during its preparation. ESCA data were obtained on an ESCALAB MKII instrument available from V. G. Scientific Ltd., which uses a 1253.6 electron volt magnesium X-Ray source. Additional details of the determination of molybdenum gradient can be found in U.S. Pat. No. 5,047,142 to Texaco as assignee of Dai et al., supra, incorporated herein by reference.

Generally the finished catalysts of this invention will be characterized by the properties set forth in Table II wherein the columns show the following:

1. The first column lists the broad ranges for the catalysts of this invention and the second column lists the preferred ranges for the catalysts of this invention, including: Total Pore Volume in cc/g; Pore Volume occupied by pores falling in designated ranges—as a volume % of Total Pore Volume (% TPV) or as a volume % of the Pore Volume in pores with diameters less than 250 Å (i.e., % of Pore Volume in the micropores) or in cc of Pore Volume per gram of catalyst; Pore Mode by volume from mercury porosimetry (dV/dD); Pore Volume falling with ±25 Å from the dV/dD peak in the less than 250 Å region; and, Surface Area in $m^2/g$.

2. The third column lists specific properties of the best known mode catalyst, Example I. The fourth column lists specific properties of a second sample, Example II, made by the same formula as Example I.

3. The remaining columns list properties for other hydroprocessing catalysts in the art.

TABLE II

Texaco R&D-PA Analyses of Catalyst Samples*

| | Instant Invention | | | | Selected | U. S. Pat. No. / |
|---|---|---|---|---|---|---|
| | Broad Ranges | Preferred Ranges | Example I | Example II | Art Ranges | Application Serial No. Reference |
| Metals | | | | | | |
| Molybdenum (as $MoO_3$) | 7–24 | 12.5–15.5 | 14.4 | 14.1 | | |
| Nickel (as NiO) | 2.2–6 | 3.0–3.5 | 3.3 | 3.4 | | |
| Silicon (as $SiO_2$) | ≦2.5 | 1.3–2.5 | 1.7 | 1.3 | | |
| Phosphorus (as $P_2O_5$) | 0.3–2.0 | 0.5–1.5 | 0.7 | 0.8 | No phosphorus is added (Preferably <0.2 wt %) | 5,435,908; 08/425,971 |
| Surface Area ($N_2$, BET) $m^2/g$ | 175–205 | 175–195 | 178 | 187 | 140–190 >220 240–310 | 4,395,328 5,221,656 5,397,456 |
| **Pore Size Distribution (Hg)\*\*** | | | | | | |
| TPV cc/g | 0.82–0.98 | 0.82–0.90 | 0.83 | 0.85 | 0.4–0.65 0.5–0.75 0.5–0.75 0.5–0.75 0.5–0.8 | 4,089,774 4,941,964 5,047,142 5,397,456 5,399,259 |
| PV, cc/g >1200Å | ~0.15–0.20 | ~0.15–0.20 | 0.20 | 0.17 | 0.23–0.31 | 5,221,656 |
| PV, cc/g >600Å, % of TPV | ~21–27 | ~21–27 | 26.6 | 23.8 | 35–55 | 4,395,329 |
| PV, cc/g >250Å, % of TPV | 29.6–33.0 | 29.6–33.0 | 33.0 | 30.9 | 5.5–22.0 1.0–15.0 11–18 22–29 22–32 | 4,941,964 5,047,142 5,397,456 5,399,259 5,435,908, 08/425,971 |
| PV, cc/g <80Å | <0.05 | <0.05 | 0.01 | 0.02 | | |
| Pore Mode (dV/dD MAX from Hg) | 110–130 | 110–130 | 121 | 121 | 40–100 | 5,221,656 |
| PV, ±25Å from dV/dD MAX, % of PV <250Å | ≧65 | ≧65 | 72.6 | 65.0 | | |
| PV, cc/g 55–115 Å, % of TPV | ~20–25 | 20–25 | 20.8 | 23.5 | 63–78 50–62.8 | 5,397,456 08/130,472 |
| PV, cc/g >1000Å, % of TPV | ~20–25 | 20.9–24.4 | 24.4 | 20.9 | 14–22 | 5,435,908; 08/425,971 |
| Median Pore Diameter (by Surface Area from Hg), Å | ~115–130 | ~115–130 | 121 | 120 | | |
| Impregnation characteristics | | | | | | |
| HDS-MAT C 0.5 g @ 550° F. | 49–73 | 49–73 | 55 | 67 | | |
| HDS-MAT, Relative k*** | 0.5–1.0 | 0.5–1.0 | 0.61 | 0.85 | | |
| Nickel Extraction, wt % | 10–14.7 | 10–14.7 | (12.0) | (NA) | 15–30 | 5,047,142 |
| ESCA Molybdenum Gradient | <5 | <5 | 1.4 | 1.2 | | |
| Average Pellet Diameter, Inches | 0.032–0.044 | 0.039–0.044 | 0.042 | 0.043 | 0.032–0.038 | 5,435,908; 08/425,971 |

*Values in parentheses obtained at Cytec Industries Stamford Research Laboratories.
**Contact angle 130°; surface tension = 484 dynes/cm.
***As described in U. S. Pat. No. 5,047,142.

The catalyst may be evaluated in a two-stage Robinson Reactor, a Continuously Stirred Tank Reactor (CSTR) which evaluates catalyst deactivation at conditions simulating those of a two-stage H-OIL ebullated bed Unit. The feedstock is an Arabian Medium/Heavy Vacuum Resid of the type set forth above. Evaluation is carried out for four or more weeks to a catalyst age of 1.86 or more barrels per pound.

Preferred Embodiment

In practice of the process of this invention, the catalyst, preferably in the form of extruded cylinders of 0.039–0.044 inch diameter and about 0.15 inch length may be placed within the first- and second-stage reactors of a two-stage H-OIL Unit. The hydrocarbon charge is admitted to the lower portion of the first-stage reactor bed in the liquid phase at 650° F.–850° F., preferably 700° F.–825° F. and 1000–3500 psia, preferably 1500–3000 psia. Hydrogen gas is admitted to the first-stage reactor of the two-stage ebullated bed H-OIL unit in amount of 2000–10,000 SCFB, preferably 3000–8000 SCFB. The hydrocarbon charge passes through the first-stage ebullated bed reactor at a LHSV of 0.16–3.0 $hr^{-1}$, preferably 0.2–2 $hr^{-1}$. During operation, the first stage reactor catalyst bed is expanded to form an ebullated bed with a defined upper level. Operation is essentially isothermal with a typical maximum temperature difference between the inlet and outlet of 0° F.–50° F., preferably 0° F.–30° F. The liquid and gaseous effluent from the first-stage reactor is admitted to the lower portion of the second-stage reactor of the two-stage H-OIL unit which is operated at essentially the same temperature and pressure as the first-stage reactor. The difference in average temperature between the first- and second-stage reactors is 0° F.–30° F., preferably 0° F.–15° F. Some additional hydrogen may optionally be injected to the second-stage reactor to make up for the hydrogen consumed by reactions in the first-stage reactor. During operation, the second-stage reactor catalyst bed is also expanded to form an ebullated bed with a defined upper level. Constant catalytic activity is maintained by periodic or continuous withdrawal of portions of used catalyst and replacement of the withdrawn material with fresh catalyst. Fresh catalyst is typically added at the rate of 0.05–1.0 pounds per barrel of fresh feed, preferably 0.20–0.40 pounds per barrel of fresh feed. An equal volume of used catalyst is withdrawn and discarded to maintain a constant inventory of catalyst on the volume basis. The catalyst replacement is performed such that equal amounts of fresh catalyst are added to the first-stage reactor and the second-stage reactor of a two-stage H-OIL unit.

In a less preferred embodiment, the reaction may be carried out in one or more continuously stirred tank reactors (CSTR) which also provides essentially isothermal conditions.

During passage through the reactor, preferably containing an ebullated bed, the hydrocarbon feedstock is converted to lower boiling products by the hydrotreating/hydrocracking reaction.

Practice of the Instant Invention

In a typical embodiment, employing a two-stage Robinson reactor pilot Unit, a charge containing 60 wt %–95 wt %, say 88.5 wt % boiling above 1000° F. may be converted to a hydrotreated product containing only 28 wt %–45 wt %, say 42 wt % boiling above 1000° F. The sulfur of the original charge is 3–7 wt %, typically 5.1 wt %; the sulfur content of the unconverted 1000° F.+ component in the product is 0.5–3.5 wt %, typically 1.6 wt %. In another embodiment, employing a two-stage Robinson reactor pilot Unit operating at +10° F. over normal operating temperatures and at a larger value of catalyst age, a charge containing 60 wt %–95 wt %, say 88.5 wt % boiling above 1000° F. may be converted to a hydrotreated product containing only 24 wt %–38 wt %, say 35.4 wt % boiling above 1000° F. The sulfur content of the unconverted 1000° F.+ component in the product is 0.5–3.5 wt %, typically 2.2 wt %. In both embodiments, the Existent IP sediment values of the 650° F.+ product leaving the reactor are extremely small; ≦0.05 wt %.

ADVANTAGES OF THE INVENTION

It will be apparent to those skilled in the art that this invention is characterized by advantages including the following:

(i) It permits attainment of increased yield of hydrocarbon products boiling below 1000° F.;

(i) It permits the attainment of the above mentioned increased yield with little or no sediment as measured by the Existent IP Sediment values of the 650° F.+ boiling point product;

(iii) It permits an improved level of sulfur removal as seen in the observed hydrodesulfurization (HDS) of the total liquid product and the substantially improved, lower level of sulfur in the unconverted 1000° F. stream; and, (iv) It permits improved levels of carbon residue reduction and nickel and vanadium removal.

Practice of the process of this invention will be apparent to those skilled in the art from the following wherein all parts are parts by weight unless otherwise stated.

DESCRIPTION OF SPECIFIC EMBODIMENTS

Best Known Mode Reactor Data

Equal amounts of Example I catalyst are placed within the reaction vessels (the first-stage and second-stage Robinson Reactors). The hydrocarbon charge (i.e., the undiluted Arabian Medium/Heavy vacuum resid, described in Table I, supra) is admitted in liquid phase to the first-stage Robinson reactor at 760° F. and 2250 psig. Hydrogen gas is admitted to the first-stage Robinson reactor in the amount of 7000 SCFB. The hydrocarbon charge passes through the first-stage Robinson reactor at a Liquid Hourly Space Velocity (LHSV) of 0.56 volumes of oil per hour per volume of liquid hold up. This is equivalent to a Catalyst Space Velocity (CSV) of 0.130 barrels of hydrocarbon charge per pound of catalyst per day. The hydrocarbon feed is uniformly contacted with hydrogen and catalyst at isothermal conditions in the first-stage Robinson reactor. The liquid and gaseous effluent from the first-stage Robinson reactor is then routed to the second-stage Robinson reactor which is operated at essentially the same temperature and pressure as the first-stage Robinson reactor. The difference in average temperature between the first- and second-stage reactors is nominally 0° F. No additional hydrogen is injected to the second-stage Robinson reactor. The liquid effluent passes through the second-stage Robinson reactor at a Liquid Hourly Space Velocity (LHSV) of 0.56 volumes of liquid effluent per hour per volume of liquid hold up. This is equivalent to a Catalyst Space Velocity (CSV) of 0.130 barrels of liquid effluent per pound of catalyst per day. The liquid effluent from the first-stage Robinson reactor is uniformly contacted with the hydrogen-containing gaseous effluent and the second loading of catalyst at isothermal conditions in the second-stage Robinson reactor. No attempt is made to maintain constant catalytic activity by periodic or continuous withdrawal of portions of used catalyst and replacement of the withdrawn material with fresh catalyst in the two-stage Robinson reactor system. The catalyst begins as fresh catalyst and accumulates catalyst age generally expressed in barrels per pound. The average temperature is defined as the average of the temperatures of the first- and second-stage reactors. Overall, the hydrocarbon charge passes through the entire process system (i.e., the first- and second-stage Robinson reactors) at an overall LHSV of 0.28 volumes of oil per hour per volume of liquid hold up. This is equivalent to an overall CSV of 0.065 barrels of hydrocarbon charge per pound of catalyst per day. As will be discussed below, the temperatures of the first- and second-stage reactors may be raised to higher levels with the catalyst of the instant invention.

Product is collected and analyzed over a range of catalyst age of 0.195 through 1.08 barrels per pound (corresponding approximately to the 3rd through 16th days of the evaluation) to yield the following averaged data:

TABLE III

| Property | Value |
| --- | --- |
| % Sulfur Removal | 79.6 |
| % Carbon Residue Reduction | 58.0 |
| % Ni Removal | 73.0 |
| % V Removal | 94.9 |
| % Hydroconversion of 1000° F.+ to 1000° F.− Materials (wt % Basis) | 52.6 |
| % Kinetically Adjusted Hydroconversion (to 0.0650 bbl/lb/day and 760.0° F.) of 1000° F.+ to 1000° F.− Materials- wt % Basis) | 52.6 |

From the above Table III, it is apparent that the process of the instant invention permits increasing the conversion of materials boiling above 1000° F. by 52.6 wt %; and sulfur, carbon residue, and metals are removed.

Upon distillation to recover (i) a first cut from the initial boiling point to 650° F., (ii) a second cut from 650° F. to 1000° F., and (iii) a third cut above 1000° F., the following is noted:

TABLE IV

|  | Product |
|---|---|
| Cut 1: up to 650° F. | |
| Specific Gravity, g/cc | 0.85 |
| Sulfur, wt % | 0.1 |
| Cut 2: 650° F.–1000° F. | |
| Specific Gravity, g/cc | 0.93 |
| Sulfur, wt % | 0.6 |
| Cut 3: 1000° F.+ | |
| Specific Gravity, g/cc | 1.02 |
| Sulfur, wt % | 1.6 |

From the above Table IV, it is apparent that the Sulfur content is decreased in all of the product fractions (from 5.1 wt % in the feed).

Upon distillation to recover (iv) a cut which boils at temperatures of about 650° F. and higher, the following is noted:

TABLE V

|  | Product |
|---|---|
| Cut 4: 650° F.+ | |
| Existent IP Sediment, wt % | 0.00 |
| Accelerated IP Sediment, wt % | 0.00 |

From the above Table, it is apparent that the process of the instant invention can operate at about 52.6 wt % conversion of feed components with boiling points greater than 1000° F. to products with boiling points less than 1000° F. without making any sediment.

EXAMPLE A

Comparison To First Generation Catalyst

Comparative data between the Example I catalyst of the instant invention and a first generation nickel/molybdenum H-OIL catalyst (Criterion HDS-1443B), collected under virtually identical reactor conditions, are given in Table VI. The process of the instant invention is superior in that it gives:

(i) No sediment versus an undesirable level with a commercially available first generation nickel/molybdenum H-OIL catalyst;
(ii) An improved level of 1000° F.+ to 1000° F.− wt % conversion once the data from both catalysts are kinetically adjusted to the target CSV and temperature;
(iii) An improved level of sulfur removal as seen in the observed hydrodesulfurization (HDS) of the total liquid product and the substantially improved, lower level of sulfur in the unconverted 1000° F. stream; and,
(iv) Improved levels of carbon residue reduction and nickel and vanadium removal.

TABLE VI

EXAMPLE A
Two-Stage Robinson Reactor Catalyst Test Results
Single-Pass, Pure Resid, No Diluent, Once Through Hydrogen
Age = 0.195 to 1.08 Barrels Per Pound

| Catalyst | Example I | 1st Generation (HDS-1443B*) |
|---|---|---|
| CSV (Bbl/Lb/Day) | 0.0668 | 0.0638 |
| Temperature (°F.) | 759.9 | 760.3 |
| (Average both stages) | | |
| Cut 4: (650° F.+) | | |
| Existent IP Sediment (wt %) | 0.00 | 0.17 |
| Accelerated IP Sediment (wt %) | 0.00 | 0.76 |
| Total Liquid Product | | |
| % Sulfur Removal | 79.6 | 78.2 |
| % Carbon Residue Reduction | 58.0 | 54.8 |
| % Nickel Removal | 73.0 | 65.4 |
| % Vanadium Removal | 94.9 | 90.8 |
| % Hydroconversion of 1000° F.+ to 1000° F.− Materials (wt %) Kinetically Adjusted (CSV and T) | 52.6 | 53.7 |
| % Hydroconversion of 1000° F.+ to 1000° F.− Materials (wt %) | 53.5 | 52.8 |
| Cut 1: up to 650° F. | | |
| Specific Gravity (g/cc) | 0.85 | 0.85 |
| Sulfur (wt %) | 0.1 | 0.1 |
| Cut 2: 650° F.–1000° F. | | |
| Specific Gravity (g/cc) | 0.93 | 0.93 |
| Sulfur (wt %) | 0.6 | 0.6 |
| Cut 3: 1000° F.+ | | |
| Specific Gravity (g/cc) | 1.02 | 1.02 |
| Sulfur (wt %) | 1.6 | 1.9 |

*Criterion HDS-1443B H-OIL catalyst.
**1st order CSTR kinetics (assuming equal rate constants for the 1st- and 2nd- stage reactors); Activation Energy = 65 kcal/mole.

EXAMPLE B

Data At Higher Temperatures

In the evaluation of the Example I catalyst of the instant invention, reactor temperatures were raised about 10° F. over a period of 2.5 days to a final temperature of approximately 770° F. (i.e., the first-stage, second-stage, and average temperatures). Product was collected and analyzed over a range of catalyst age of 1.28 through 1.86 barrels per pound (corresponding approximately to the 19th through 28th days of the evaluation). Comparative data between the catalyst of the instant invention operating at about +10° F. compared to the first generation nickel/molybdenum H-OIL catalyst (Criterion HDS-1443B) at the same catalyst ages are given in Table VII. The process of the instant invention is superior in that it gives:

(i) Low sediment at 60 wt % 1000° F.+ to 1000° F.− conversion versus an undesirable level with the first generation nickel/molybdenum H-OIL catalyst operating at only 52 wt % 1000° F.+ to 1000° F.− conversion;
(ii) An improved level of 1000° F.+ to 1000° F.− wt % conversion by the observed data and once the data from both catalysts are kinetically adjusted to the target CSV;
(iii) An improved level of sulfur removal as seen in the observed hydrodesulfurization (HDS) of the total liquid product and the substantially improved, lower level of sulfur in the unconverted 1000° F.+ stream; and
(iv) Improved levels of carbon residue reduction and nickel and vanadium removal.

It was noted that the sulfur levels of the 650° F.+–1000° F.+ bp boiling cut (approximating the composition of a vacuum gas oil) were slightly higher with the Example I catalyst of the instant invention operating at about +10° F. compared to the level obtained with the first generation catalyst when both were at catalyst ages of 1.28 through 1.86 barrels per pound.

The catalyst of the instant invention, besides giving low sediment results for the 650° F.+ boiling cut, also showed improved operability. The evaluation went smoothly at both 760° F. and 770° F. On the other hand, the first generation catalyst evaluation showed evidence of plugging due to accumulated sediment during the course of the run. Operations became somewhat erratic with the first generation catalyst at about 1.54 bbl/pound catalyst age and the unit had to be shut down and partially cleaned out before we could complete the evaluation of the first generation catalyst. With so much trouble due to sediment, it was felt that temperatures could not be raised any higher with the first generation catalyst.

TABLE VII

EXAMPLE B
Two-Stage Robinson Reactor Catalyst Test Results
Single-Pass, Pure Resid, No Diluent, Once Through Hydrogen
Age = 1.28 to 1.86 Barrels Per Pound
(We have now raised temperature ⁻10° F. for Example I)

| Catalyst | Example I | 1st Generation (HDS-1443B*) |
|---|---|---|
| CSV (Bbl/Lb/Day) | 0.0651 | 0.0643 |
| Temperature (°F.) | 770.3 | 760.7 |
| (Average both stages) | | |
| Cut 4: (650° F.+) | | |
| Existent IP Sediment (wt %) | 0.05 | 0.15 |
| Accelerated IP Sediment (wt %) | 0.33 | 0.559 |
| Total Liquid Product | | |
| % Sulfur Removal | 75.9 | 71.7 |
| % Carbon Residue Reduction | 57.3 | 52.5 |
| % Nickel Removal | 73.9 | 62.7 |
| % Vanadium Removal | 94.8 | 88.3 |
| % Hydroconversion of 1000° F.+ to 1000° F.– Materials (wt %) Kinetically Adjusted (CSV ONLY) | 60.0 | 52.0 |
| % Hydroconversion of 1000° F.+ to 1000° F.– Materials (wt %) | 60.0 | 51.7 |
| Cut 1: up to 650° F. | | |
| Specific Gravity (g/cc) | 0.84 | 0.84 |
| Sulfur (wt %) | 0.2 | 0.2 |
| Cut 2: 650° F.–1000° F. | | |
| Specific Gravity (g/cc) | 0.93 | 0.93 |
| Sulfur (wt %) | 0.9 | 0.8 |
| Cut 3: 1000° F.+ | | |
| Specific Gravity (g/cc) | 1.03 | 1.03 |
| Sulfur (wt %) | 2.2 | 2.5 |

*Criterion HDS-1443B H-OIL catalyst.
**1st order CSTR kinetics (assuming equal rate constants for the 1st- and 2nd- stage reactors).

I claim:

1. A process for hydrotreating a charge hydrocarbon feed containing components boiling above 1000° F. and sulfur, metals, and carbon residue which comprises:
    contacting said hydrocarbon feed with hydrogen at isothermal hydroprocessing conditions in the presence of, as catalyst, a porous alumina support containing ≦2.5 wt % of silica and bearing 2.2 to 6 wt % of a Group VIII metal oxide, 7 to 24 wt % of a Group VIB metal oxide and 0.3 to 2 wt % of a loaded phosphorus oxide,
    said catalyst having a Total Surface Area of 175 to 205 m²/g, a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å,
    thereby forming hydroprocessed product containing decreased content of components boiling above 1000° F. and sulfur, metals and carbon residue,
    and recovering said hydroprocessed product containing decreased content of components boiling above 1000° F., and of sulfur, metals and carbon residue, and
    recovering said hydroprocessed product containing decreased content of sediment in the portion of the hydroprocessed product boiling above 650° F.

2. A process for hydrotreating a charge hydrocarbon feed as claimed in claim 1 wherein said Group VIB metal oxide is molybdenum oxide in an amount of 12.5 to 15.5 wt %.

3. A process for hydrotreating a charge hydrocarbon feed as claimed in claim 1 wherein said Group VIII metal oxide is nickel oxide in an amount of 3.0 to 3.5 wt %.

4. A process for hydrotreating a charge hydrocarbon feed as claimed in claim 1 wherein the content of silica is 1.3 to 2.5 wt %.

5. A process for hydrotreating a charge hydrocarbon feed as claimed in claim 1 wherein the content of phosphorus oxide is 0.5 to 1.5 wt % and is loaded onto the catalyst as aqueous phosphoric acid.

6. A process for hydrotreating a charge hydrocarbon feed as claimed in claim 1 wherein said Total Surface Area is about 175 to 195 m²/g.

7. A process for hydrotreating a charge hydrocarbon feed as claimed in claim 1 wherein said Total Pore Volume is about 0.82 to 0.90 cc/g.

8. A process for hydrotreating a charge hydrocarbon feed containing components boiling above 1000° F. and sulfur, metals, and carbon residue which comprises:
    contacting said hydrocarbon feed with hydrogen at isothermal hydroprocessing conditions in the presence of, as catalyst, a porous alumina support containing ≦2.5 wt % of silica and bearing 2.2 to 6 wt % of a Group VIII metal oxide, 7 to 24 wt % of a Group VIB metal oxide and 0.3 to 2 wt % of a loaded phosphorus oxide,
    said catalyst having a Total Surface Area of 175 to 205 m²/g , a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, 21 to 27% of the Total Pore Volume is present in pores with a diameter >600 Å and 0.15 to 0.20 cc/g of the Total Pore Volume is present in pores having a diameter >1200 Å,
    thereby forming hydroprocessed product containing decreased content of components boiling above 1000° F. and sulfur, metals and carbon residue,
    and recovering said hydroprocessed product containing decreased content of components boiling above 1000° F., and of sulfur, metals and carbon residue, and recovering said hydroprocessed product containing decreased content of sediment in the portion of the hydroprocessed product boiling above 650° F.

9. A process for hydrotreating a charge hydrocarbon feed as claimed in claim 8 wherein said Group VIB metal oxide is molybdenum oxide in an amount of 12.5 to 15.5 wt %.

10. A process for hydrotreating a charge hydrocarbon feed as claimed in claim 8 wherein said Group VIII metal oxide is nickel oxide in an amount of 3.0 to 3.5 wt %.

11. A process for hydrotreating a charge hydrocarbon feed as claimed in claim 8 wherein the content of silica is 1.3 to 2.5 wt %.

12. A process for hydrotreating a charge hydrocarbon feed as claimed in claim 8 wherein the content of phosphorus oxide is 0.5 to 1.5 wt %, and is loaded onto the catalyst as aqueous phosphoric acid.

13. A process for hydrotreating a charge hydrocarbon feed as claimed in claim 8 wherein said Total Surface Area is about 175 to 195 m$^2$/g.

14. A process for hydrotreating a charge hydrocarbon feed as claimed in claim 8 wherein said Total Pore Volume is about 0.82 to 0.90 cc/g.

15. A process for hydrotreating a charge hydrocarbon feed containing components boiling above 1000° F. and sulfur, metals, and carbon residue which comprises:

contacting said hydrocarbon feed with hydrogen at isothermal hydroprocessing conditions in the presence of, as catalyst, a porous alumina support containing 1.3 to 2.5 wt % of silica and bearing 3.0 to 3.5 wt % of nickel oxide, 12.5 to 15.5 wt % of molybdenum oxide and 0.5 to 1.5 wt % of a loaded phosphorus oxide, said catalyst having a Total Surface Area of 175 to 195 m$^2$/g, a Total Pore Volume of 0.82 to 0.90 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, thereby forming hydroprocessed product containing decreased content of components boiling above 1000° F. and sulfur, metals and carbon residue, and recovering said hydroprocessed product containing decreased content of components boiling above 1000° F., and of sulfur, metals and carbon residue, and recovering said hydroprocessed product containing decreased content of sediment in the portion of the hydroprocessed product boiling above 650° F.

16. A process for hydrotreating a charge hydrocarbon feed containing components boiling above 1000° F. and sulfur, metals, and carbon residue which comprises:

contacting said hydrocarbon feed with hydrogen at isothermal hydroprocessing conditions in the presence of, as catalyst, a porous alumina support containing 1.3 to 2.5 wt % of silica and bearing 3.0 to 3.5 wt % of nickel oxide, 12.5 to 15.5 wt % of molybdenum oxide and 0.5 to 1.5 wt % of a loaded phosphorus oxide, said catalyst having a Total Surface Area of 175 to 195 m$^2$/g, a Total Pore Volume of 0.82 to 0.90 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, 21 to 27% of the Total Pore Volume is present in pores with a diameter >600 Å and 0.15 to 0.20 cc/g of the Total Pore Volume is present in pores having a diameter >1200 Å, thereby forming hydroprocessed product containing decreased content of components boiling above 1000° F. and sulfur, metals and carbon residue, and recovering said hydroprocessed product containing decreased content of components boiling above 1000° F., and of sulfur, metals and carbon residue, and recovering said hydroprocessed product containing decreased content of sediment in the portion of the hydroprocessed product boiling above 650° F.

17. In a process for hydrotreating a charge hydrocarbon feed containing components boiling above 1000° F. and sulfur, metals, and carbon residue to form a hydroprocessed product containing decreased content of components boiling above 1000° F., decreased sulfur, decreased metals and decreased carbon residue and recovering said hydroprocessed product, an improvement which allows operations at +10° F., increases conversion of components boiling above 1000° F. to product boiling below 1000° F. by 8 wt %, and decreases Existent IP Sediment Test values in the portion of the hydroprocessed product boiling above 650° F. to 0.05 wt % which comprises contacting said hydrocarbon feed with hydrogen at isothermal hydroprocessing conditions in the presence of, as catalyst, a porous alumina support containing ≦2.5 wt % of silica and bearing 2.2 to 6 wt % of a Group VIII metal oxide, 7 to 24 wt % of a Group VIB metal oxide and 0.3 to 2 wt % of a phosphorus oxide, the phosphorous oxide being loaded onto the catalyst as aqueous phosphoric acid, said catalyst having a Total Surface Area of 175 to 205 m$^2$/g, a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å.

18. In a process for hydrotreating a charge hydrocarbon feed containing components boiling above 1000° F. sulfur, metals and carbon residue to form a hydroprocessed product containing decreased content of components boiling above 1000° F. decreased sulfur, decreased metals and decreased carbon residue and recovering said hydroprocessed product, an improvement which allows operations at +10° F., increases conversion of components boiling above 1000° F. to product boiling below 1000° F. by 8 wt %, and decreases Existent IP Sediment Test values in the portion of the hydroprocessed product boiling above 650° F. to 0.05 wt % which comprises contacting said hydrocarbon feed with hydrogen at isothermal hydroprocessing conditions in the presence of, as catalyst, a porous alumina support containing ≦2.5 wt % of silica and bearing 2.2 to 6 wt % of a Group VIII metal oxide, 7 to 24 wt % of a Group VIB metal oxide and 0.3 to 2 wt % of a phosphorus oxide, the phosphorous oxide being loaded onto the catalyst as aqueous phosphoric acid, said catalyst having a Total Surface Area of 175 to 205 m$^2$/g, a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, 21 to 27% of the Total Pore Volume is present in pores with a diameter >600 Å and 0.15 to 0.20 cc/g of the Total Pore Volume is present in pores having a diameter >1200 Å.

19. In a process for hydrotreating a charge hydrocarbon feed containing components boiling above 1000° F. sulfur, metals and carbon residue to form a hydroprocessed product containing decreased content of components boiling above 1000° F. decreased sulfur, decreased metals and decreased carbon residue and recovering said hydroprocessed product, an improvement which allows operations at +10° F., increases conversion of components boiling above 1000° F. to product boiling below 1000° F. by 8 wt %, and decreases Existent IP Sediment Test values in the portion of the hydroprocessed product boiling above 650° F. to 0.05 wt % which comprises contacting said hydrocarbon feed with hydrogen at isothermal hydroprocessing conditions in the presence of, as catalyst, a porous alumina support containing 1.3 to 2.5 wt % of silica and bearing 3.0 to 3.5 wt % of nickel oxide, 12.5 to 15.5 Wt % of molybdenum oxide and 0.5 to 1.5 wt % of a phosphorus oxide, the phosphorous oxide being loaded onto the catalyst as aqueous phosphoric acid, said catalyst having a Total Surface Area of 175 to 195 m$^2$/g, a Total Pore Volume of 0.82 to 0.90 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å.

20. In a process for hydrotreating a charge hydrocarbon feed containing components boiling above 1000° F. sulfur, metals and carbon residue to form a hydroprocessed product containing decreased content of components boiling above 1000° F. decreased sulfur, decreased metals and decreased carbon residue and recovering said hydroprocessed product, an improvement which allows operations at +10° F., increases conversion of components boiling above 1000° F. to product boiling below 1000° F. by 8 wt %, and decreases Existent IP Sediment Test values in the portion of the hydroprocessed product boiling above 650° F. to 0.05 wt % which comprises contacting said hydrocarbon feed with hydrogen at isothermal hydroprocessing conditions in the presence of, as catalyst, a porous alumina support containing 1.3 to 2.5 wt % of silica and bearing 3.0 to 3.5 wt % of nickel oxide, 12.5 to 15.5 wt % of molybdenum oxide and 0.5 to 1.5 wt % of a phosphorus oxide, the phosphorous oxide being loaded onto the catalyst as aqueous phosphoric acid, said catalyst having a Total Surface Area of 175 to 195 m$^2$/g, a Total Pore Volume of 0.82 to 0.90 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, 21 to 27% of the Total Pore Volume is present in pores with a diameter >600 Å and 0.15 to 0.20 cc/g of the Total Pore Volume is present in pores having a diameter >1200 Å.

21. A process for hydrotreating a charge hydrocarbon feed containing components boiling above 1000° F. and sulfur, metals and carbon residue which comprises:

contacting said hydrocarbon feed with hydrogen at isothermal hydroprocessing conditions in the presence of, as catalyst, a porous alumina support containing ≦2.5 wt % of silica and bearing 2.2 to 6 wt % of a Group VIII metal oxide, 7 to 24 wt % of a Group VIB metal oxide and 0.3 to 2 wt % of a phosphorus oxide, the phosphorous oxide content being loaded onto the catalyst as aqueous phosphoric acid, said catalyst having a Total Surface Area of 175 to 205 m$^2$/g, a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, thus forming hydroprocessed product containing decreased content of components boiling above 1000° F. and sulfur, metals and carbon residue, and recovering said hydroprocessed product containing decreased content of components boiling above 1000° F., and of sulfur, metals and carbon residue, and recovering said hydroprocessed product containing decreased content of sediment in the portion of the hydroprocessed product boiling above 650° F.

22. A process for hydrotreating a charge hydrocarbon feed containing components boiling above 1000° F. and sulfur, metals and carbon residue which comprises:

contacting said hydrocarbon feed with hydrogen at isothermal hydroprocessing conditions in the presence of, as catalyst, a porous alumina support containing ≦2.5 wt % of silica and bearing 2.2 to 6 wt % of a Group VIII metal oxide, 7 to 24 wt % of a Group VIB metal oxide and 0.3 to 2 wt % of a loaded phosphorus oxide, said catalyst having a Total Surface Area of 175 to 205 m$^2$/g, a Total Pore Volume of 0.82 to 0.98 cc/g, and a Pore Diameter Distribution wherein 29.6 to 33.0% of the Total Pore Volume is present as macropores of diameter greater than 250 Å, 67.0 to 70.4% of the Total Pore Volume is present as micropores of diameter less than 250 Å, ≧65% of the micropore volume is present as micropores of diameter ±25 Å about a pore mode by volume of 110 to 130 Å, less than 0.05 cc/g of micropore volume is present in micropores with diameters less than 80 Å, thus forming hydroprocessed product containing decreased content of components boiling above 1000° F. and sulfur, metals and carbon residue, and recovering said hydroprocessed product containing decreased content of components boiling above 1000° F., and of sulfur, metals and carbon residue, and recovering said hydroprocessed product containing decreased content of sediment in the portion of the hydroprocessed product boiling above 650° F. and wherein the under the same reaction conditions the level of conversion is increased over the conversion levels obtained using a catalyst in which the phosphorous oxide content is less than 0.2%.

* * * * *